(12) United States Patent
Meckes et al.

(10) Patent No.: US 8,210,175 B2
(45) Date of Patent: Jul. 3, 2012

(54) METHOD AND APPARATUS FOR EMERGENCY SUPPLY OF OXYGEN IN AN AIRCRAFT

(75) Inventors: Rüdiger Meckes, Berkenthin (DE); Wolfgang Rittner, Siblin (DE)

(73) Assignee: B/E Aerospace Systems GmbH, Lubeck (DE)

( * ) Notice: Subject to any disclaimer, the term of this patent is extended or adjusted under 35 U.S.C. 154(b) by 1182 days.

(21) Appl. No.: 12/028,061

(22) Filed: Feb. 8, 2008

(65) Prior Publication Data

US 2008/0202511 A1    Aug. 28, 2008

(30) Foreign Application Priority Data

Feb. 9, 2007   (DE) .................. 10 2007 006 556

(51) Int. Cl.
| | |
|---|---|
| *A62B 7/08* | (2006.01) |
| *A62B 21/00* | (2006.01) |
| *A62B 7/10* | (2006.01) |
| *A62B 19/00* | (2006.01) |
| *A62B 23/02* | (2006.01) |
| *A61M 15/00* | (2006.01) |
| *A61M 16/00* | (2006.01) |

(52) U.S. Cl. .......... 128/205.12; 128/202.26; 128/205.27
(58) Field of Classification Search ............ 128/200.24, 128/202.13, 204.18, 204.29, 205.12, 205.27; 95/148; 96/130, 133, 143, 144
See application file for complete search history.

(56) References Cited

U.S. PATENT DOCUMENTS

| | | | |
|---|---|---|---|
| 4,648,888 A * | 3/1987 | Rowland | 95/8 |
| 4,681,602 A | 7/1987 | Glenn et al. | |
| 6,294,775 B1 | 9/2001 | Seibel et al. | |
| 6,558,451 B2 * | 5/2003 | McCombs et al. | 95/98 |
| 7,410,526 B2 * | 8/2008 | Haas et al. | 95/90 |
| 2004/0245390 A1 | 12/2004 | Meckes et al. | |

FOREIGN PATENT DOCUMENTS

| | | |
|---|---|---|
| DE | 10323138 A1 | 12/2004 |
| EP | 1 152 261 A1 | 11/2001 |
| EP | 1 452 125 A3 | 10/2004 |
| EP | 1 622 200 A1 | 2/2006 |
| FR | 2855061 A1 | 11/2004 |
| GB | 2397821 A | 8/2004 |
| WO | 03/028810 A1 | 4/2003 |

OTHER PUBLICATIONS

Robert Lange et al., "Solid-State Time-of-Flight Range Camera", Journal of Quantum Electronics, vol. 37, No. 3, pp. 390-397, (2001).
Office Action issued Jan. 28, 2008 in German Appln. Ser. No. 10 2007 006 556.8.
FR Search Report and Opinion dated Nov. 18, 2010 in FR Application No. FR 08 50775.

* cited by examiner

*Primary Examiner* — Kristen Matter
(74) *Attorney, Agent, or Firm* — Panitch Schwarze Belisario & Nadel LLP

(57) ABSTRACT

A method is provided for emergency supply of oxygen in an aircraft. First, stored oxygen is led to the oxygen masks of the aircraft occupants, and simultaneously a part of the stored oxygen is used for flushing molecular sieve beds of an air decomposition device, at the beginning of the emergency supply. Subsequently, the air decomposition device assumes the oxygen supply to the aircraft occupants.

9 Claims, 1 Drawing Sheet

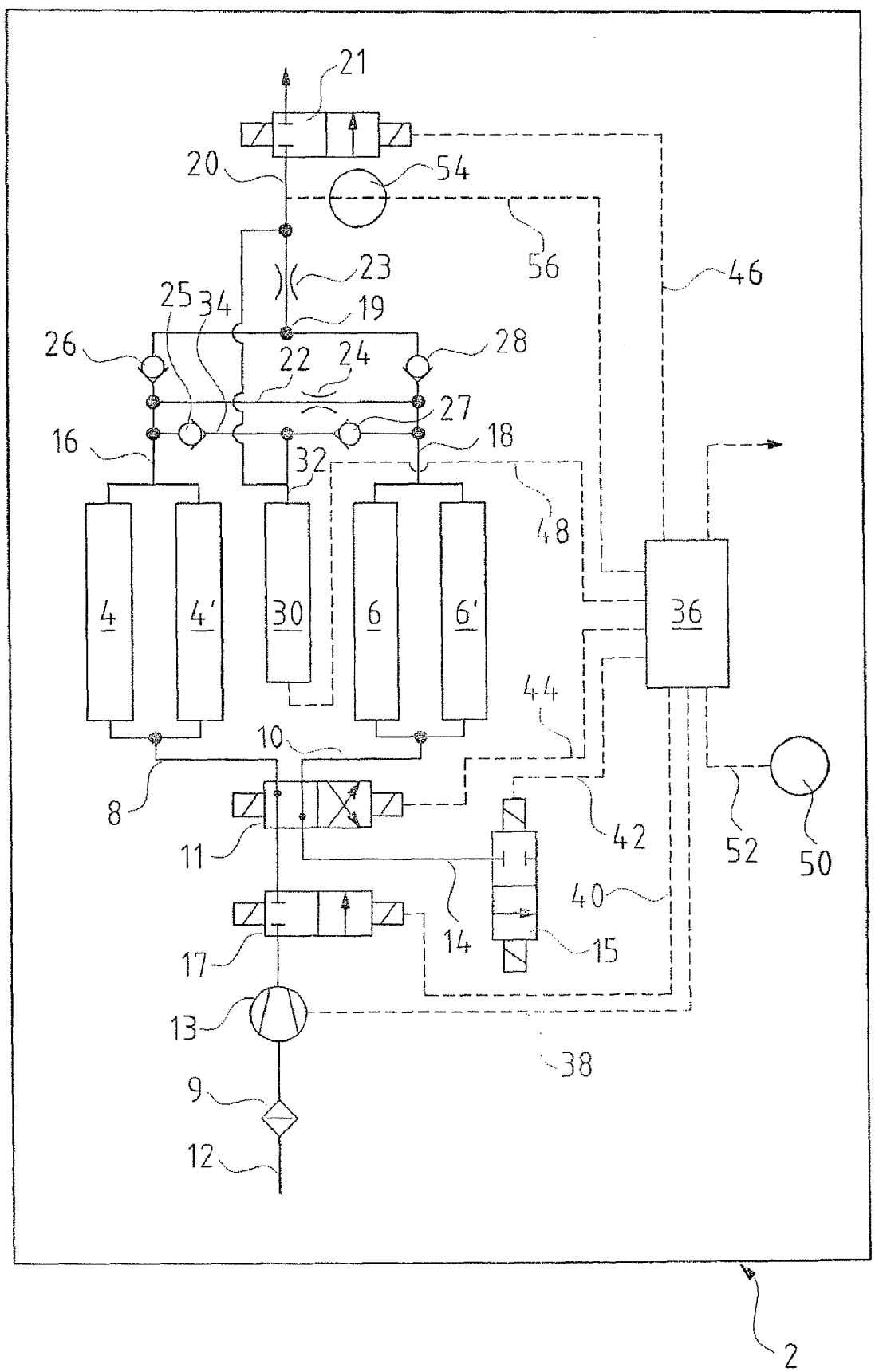

METHOD AND APPARATUS FOR EMERGENCY SUPPLY OF OXYGEN IN AN AIRCRAFT

BACKGROUND OF THE INVENTION

The invention relates to a method for the emergency supply of oxygen in an aircraft, as well as to an emergency oxygen supply apparatus for carrying out this method.

After an incident of decompression on board a passenger aircraft, it is common, for reasons of safety, to descend the aircraft to an altitude which permits breathing without additional oxygen supply. The distance to the destination airport or the alternative airport may be considerable, depending on the flight path and the location of the incident of decompression, so that the reduced flight altitude leads to significantly higher fuel consumption. A reserve fuel supply must be carried along on board the aircraft for this reason, which entails a correspondingly large weight load and reduction of the payload capacity of the aircraft caused by this.

For this reason, in the case of decompression, one strives to descend only to an altitude which is acceptable with regard to the additional fuel consumption, and to supply the passengers with additional oxygen via passenger oxygen masks during the remaining flight duration. Until now, the disadvantage of this procedure has been the fact that the additional oxygen provided in aircraft for a possible emergency oxygen supply, as a rule, must be carried along in high-pressure containers or chemical oxygen generators. The storage capacity of these oxygen storage devices is relatively low and also may not be significantly increased on account of the limited space available in aircraft.

BRIEF SUMMARY OF THE INVENTION

Against this background, it is an object of the invention to provide a method for emergency supply of oxygen in an aircraft, with which the passengers may be provided with oxygen to an adequate extent over a longer period of time. Furthermore, a corresponding emergency oxygen supply apparatus is to be provided.

The method according to the invention is achieved in that, first, stored oxygen is led to at least one oxygen mask of an aircraft occupant at the beginning of the emergency supply, and simultaneously a part of the stored oxygen is used for flushing molecular sieve beds of an air decomposition device, whereupon subsequently the air decomposition device assumes the oxygen supply of the at least one aircraft occupant.

An emergency oxygen supply apparatus for carrying out this method has an air decomposition device which comprises at least two molecular sieve beds and which at the exit side may be conductingly connected to at least one oxygen mask, wherein at least one oxygen storage device is provided, which simultaneously may be conductingly connected to the air decomposition device as well as to the oxygen mask Preferred embodiments of the invention may be deduced from the following description and the drawing.

The method according to the invention, for emergency supply of oxygen in an aircraft, basically envisages producing the oxygen, which is to be provided to the passengers in an emergency situation, in one or more air decomposition devices functioning according to the principle of pressure change adsorption, for example on board the aircraft. Air decomposition devices of this type have at least two molecular sieve beds, which are alternately operated in an adsorption cycle and a desorption cycle, wherein they separate oxygen and nitrogen in the adsorption cycle and are regenerated in the desorption cycle.

The application of air decomposition devices permits the passengers to be supplied with oxygen essentially over an unlimited time. However, oxygen produced by the air decomposition device is not supplied to the oxygen masks of the aircraft passengers from the beginning, but rather the invention envisages first supplying the oxygen stored on board the aircraft to the oxygen masks of the aircraft occupants at the beginning of the emergency supply. This procedure advantageously ensures that the oxygen supply of aircraft occupants is also ensured during a starting phase of the air decomposition, in which the air decomposition device has not yet produced an adequate quantity of oxygen.

According to one embodiment, the invention further envisages simultaneously using a part of the stored oxygen for flushing the molecular sieve beds of the air decomposition device, i.e., the molecular sieve beds are cleaned and subsequently filled with a flushing gas flow, which is formed by the oxygen stored on board, before the nitrogen contained in the air is separated from the oxygen in the molecular sieve beds. After the flushing of the molecular sieve beds, the air decomposition device assumes the oxygen supply of the aircraft occupants, whereby the molecular sieve beds then display their optimal operating behavior on account of the previous flushing and subsequent filling with oxygen.

It is basically possible to supply the air decomposition device with air which is sucked from the environment of the aircraft, for example by its engines. The molecular sieve beds of the air decomposition device during its adsorption cycle are, however, preferably filled with air from the aircraft cabin. This has the advantage that the air supplied to the molecular sieve beds is already preconditioned with regard to its temperature and humidity by the air conditioning of the aircraft. This procedure is particularly advantageous if the air decomposition takes place in the aircraft cabin, i.e., if the molecular sieve beds are arranged in the aircraft cabin, e.g., in the personal service units arranged above the passenger seats. In this case, it is possible to suction the air in the direct vicinity of the air decomposition device without having to lead it through the aircraft over large distances.

The cabin air is usefully compressed before introduction into the molecular sieve beds, in order to create the necessary operating pressure for the adsorption of nitrogen in the molecular sieve beds of the air decomposition device. For this purpose, compressors with a very high volume throughput are usefully used, in order to be able to produce oxygen in the air decomposition device in an adequate amount.

An emergency oxygen supply apparatus is provided for an aircraft for carrying out the method described above. The emergency oxygen supply apparatus comprises an air decomposition device with at least two molecular sieve beds. On the exit side, this air decomposition device may be conductingly connected to at least one oxygen mask. According to an embodiment of the invention, an oxygen storage device is further provided, which simultaneously may be conductingly connected to the air decomposition device as well as to the oxygen mask.

The emergency oxygen supply apparatus according to the invention is preferably designed for the emergency oxygen supply of only one aircraft passenger or a group of aircraft passengers, and accordingly is connected via a supply conduit to only one oxygen mask or several oxygen masks. The oxygen storage device may be formed by a high-pressure container in which oxygen is stored in a gaseous manner, or also by a chemical oxygen generator, in which the oxygen is present first in a chemically bonded form. The oxygen quantity to be stored in the oxygen storage device is accordingly low, since with the emergency oxygen supply method according to the invention, oxygen originating from the oxygen storage device is only required in a relatively short initial phase for the respiration of an aircraft passenger and for flushing the molecular sieve beds. For this reason, one may advantageously apply oxygen storage devices of a correspondingly small size. This advantageously permits a very compact construction of the complete emergency oxygen supply apparatus, which renders possible an arrangement in a personal service unit provided above a passenger seat.

Preferably, the adsorbing molecular sieve beds of the air decomposition device are fed with cabin air. For this purpose, the air decomposition device may usefully be conductingly connected to the aircraft cabin.

A compressor is preferably arranged in the conduit connection from the aircraft cabin to the air decomposition device. With this compressor the air suctioned in the cabin is compressed to the operating pressure required in the molecular sieve beds. This compressor is preferably designed as a radial compressor, with which the cabin air is preferably compressed to threefold to fourfold that of the cabin pressure.

According to one embodiment of the invention, a control device is advantageously provided for activation of the air decomposition device and the oxygen storage device. This control device is signal-connected to a pressure sensor in the aircraft cabin. A pressure drop in the aircraft cabin may be determined with the pressure sensor, whereupon the control creates the operation condition of the emergency oxygen supply apparatus. Furthermore, the cabin pressure may be continuously monitored with the pressure sensor, and the emergency oxygen supply apparatus is then activated by the control, depending on the evaluated pressure values.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a pneumatic circuit diagram showing schematically the control technology of an emergency oxygen supply apparatus according to an embodiment of the present invention.

DETAILED DESCRIPTION OF THE INVENTION

The drawing shows the pneumatic circuit diagram with regard to control technology of an emergency oxygen supply apparatus 2. This emergency oxygen supply apparatus 2 comprises an air decomposition device with respective molecular sieve beds 4, 4' and 6, 6', which are arranged in parallel in pairs. On the entry side of the molecular sieve beds 4, 4', these have a common air inlet 8, and the molecular sieve beds 6 and 6' have a common air inlet 10.

Either the molecular sieve bed pair comprising the molecular sieve beds 4 and 4' or the molecular sieve bed pair comprising the molecular sieve beds 6 and 6' may be conductingly connected to an air supply conduit 12 running into an aircraft cabin by way of an electrically actuated 4/2-way valve 11. The 4/2-way valve 11 conductingly connects the molecular sieve bed pair, which is then not conductingly connected to the air supply conduit 12, to a flushing gas conduit 14, which may be closed at its end with an electrically actuated 2/2-way valve 15. First, an air filter 9, a compressor in the form of a radial compressor 13, and an electrically actuated 2/2-way valve 17 are arranged on the inflow side of the 4/2-way valve 11 in the air supply conduit 12 in the flow direction.

A product gas outlet 16 is provided on the exit side of the molecular sieve beds 4 and 4', and a product gas outlet 18 is provided on the exit side of the molecular sieve beds 6 and 6'. The product gas outlets 16 and 18 run out at a conduit connection 19 in a common product gas conduit 20, at whose end a passenger oxygen mask (not represented in the drawing) is arranged. The product gas conduit 20 may be closed with an electrically actuatable 2/2-way valve 21 arranged therein. A throttle 23 is provided in the product gas conduit 20 on the entry side of the 2/2-way valve 21, for limiting the product gas flow in the product gas conduit 20.

The product gas outlets 16 and 18 are flow connected via a conduit 22 on the inflow side of the conduit connection 19, wherein a throttle 24 for limitation of throughflow is provided in the conduit 22. A return valve 26 is arranged in the product gas outlet 16 on the inflow side of the conduit connection 19, and a return valve 28 is arranged in the product gas outlet 18 likewise on the inflow side of the conduit connection 19, in order to prevent a further overflow of the product gas 16 to the product gas outlet 18, and vice versa, at the conduit connection 19.

The emergency oxygen supply apparatus 2, apart from the air decomposition device comprised essentially of the molecular sieve beds 4, 4' and 6, 6', also comprises an oxygen storage device 30, which is formed by a high-pressure container 30. An oxygen outlet 32 of the high-pressure container 30 is conductingly connected, on the one hand, to the product gas conduit 20, where the oxygen outlet 32 runs out in the product gas conduit 20 on the exit side of the throttle 23. The oxygen outlet 32, on the other hand, is also connected to a conduit 34, which creates a flow connection from the oxygen outlet 32 to the product gas outlet 16 of the molecular sieve beds 4, 4', as well as to the product gas outlet 18 of the molecular sieve beds 6, 6'. Two return valves 25 and 27 are arranged in the conduit 34, in order to prevent an overflow of the product gas from the product gas outlet 16 via the conduit 34 to the product gas outlet 18, wherein the return valve 25 blocks the flow path from the product gas outlet 16 to the product gas outlet 18. Similarly, the return valve 27 blocks the flow path from the product gas outlet 18 to the product gas outlet 16.

The activation and energy supply of the electrically actuated components of the emergency oxygen supply apparatus 2 are effected by way of a control device in the form of an electronic control 36. This control 36 is signal connected via a signal lead 38 to the radial compressor 13, via a signal lead 40 to the 2/2-way valve 17, via a signal lead 42 to the 2/2-way valve 15, via a signal lead 44 to the 4/2-way valve 11, via a signal lead 46 to the 2/2-way valve 21, and via a signal lead 48 to the high pressure container 30. Apart from this, a signal connection from the control 36 to a pressure sensor 50 arranged in the aircraft cabin is created by way of a signal lead 52, and a signal connection to a micro-zirconium dioxide oxygen sensor 54 is created by way of a signal lead 56.

The method according to one embodiment of the invention, for the emergency supply of oxygen, is hereinafter described in more detail by way of the emergency oxygen supply apparatus 2 represented in the drawing.

With an inactive emergency oxygen supply apparatus 2, the 2/2-way valves 15, 17 and 21 are switched in a blocking manner by the control 36, so that the air supply conduit 12, the flushing gas conduit 14, and the product gas conduit 20 are closed. In this manner, one prevents water from being able to penetrate into the molecular sieve beds 4, 4' and 6, 6', when the emergency oxygen supply apparatus 2 is not in operation. The penetration of water would reduce the adsorption capability of the zeolite used as an adsorption agent.

If the pressure sensor 50 arranged in the aircraft cabin detects a pressure drop, the 2/2-way valves 15, 17 and 21 are switched to open by the control 36. In this manner, the molecular sieve beds 4, 4' and 6, 6' are relieved, and desorption to ambient pressure is initiated in them. Apart from this, the high-pressure container 30 is switched to open by the control 36, whereupon the oxygen located in the high-pressure container 30 is led, via the oxygen outlet 32 formed on the high-pressure container 30, into the product gas conduit 20, from where the oxygen is led to the oxygen mask of a passenger. Simultaneously, a part flow of the oxygen stored in the high-pressure container 30 is led into the conduit 34 and from there, via the product gas outlets 16 and 18 as flushing gas, into the molecular sieve beds 4, 4' and 6, 6', and is led away from there via the flushing gas conduit 14. The flushing time of the molecular sieve beds 4, 4' and 6, 6' with the oxygen originating from the high-pressure container 30 is preferably two to four seconds. After this time duration, the control 36 initiates the closure of the 2/2-way valve 15, so that no further oxygen is led away via the flushing gas conduit 14.

Thereafter, oxygen continues to be led from the high-pressure container 30 to the oxygen mask of the passenger and into the molecular sieve beds 4, 4' and 6, 6', wherein the oxygen flow in the product gas conduit 20 is detected by the oxygen sensor 54. If the oxygen volume flow sinks below a predefined value, the radial compressor 13 is set into operation by the control 36. In this manner, the cabin air is sucked via the air supply conduit and compressed by the radial compressor 13. The sucked cabin air is cleaned in an air filter 9 before entry into the radial compressor 13.

The 4/2-way valve 11 is activated by the control 36, such that the compressed air may flow via the air inlet 8 into the molecular sieve beds 4, 4'. The product gas leaving the molecular sieve chambers 4, 4' has an adequately high oxygen content within the shortest time, due to the fact that all molecular sieve beds 4, 4' and 6, 6' have been previously filled with oxygen from the high-pressure container 30. This product gas is led to the oxygen mask of the passenger, wherein a part flow of the product gas leaving the product gas outlet 16 is led via the conduit 22 as a flushing gas into the molecular sieve beds 6, 6'. When the adsorption capacity of the molecular sieve beds 4, 4' are exhausted, the control 36 initiates a switch-over of the 4/2-way valve 11, whereupon the cabin air compressed by the radial compressor 13 is now led into the molecular sieve beds 6, 6', wherein the nitrogen component of the air is adsorbed and the product gas enriched with oxygen, available at the exit side of the molecular sieve beds 6, 6', is led on the one hand as a breathing gas to the passenger, and on the other hand as a flushing gas to the molecular sieve beds 4, 4'.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for emergency supply of oxygen in an aircraft, the method comprising feeding stored oxygen to at least one oxygen mask of an aircraft occupant at a beginning of the emergency supply, simultaneously using a part of the stored oxygen for flushing molecular sieve beds of an air decomposition device, and subsequently having the air decomposition device assume the oxygen supply to the at least one aircraft occupant mask.

2. The method according to claim 1, wherein the molecular sieve beds of the air decomposition device are fed with air from a cabin of the aircraft during an adsorption cycle of the beds.

3. The method according to claim 2, wherein the cabin air is compressed.

4. An emergency oxygen supply apparatus for an aircraft, comprising an air decomposition device having at least two molecular sieve beds, the air decomposition device being conductingly connected at its exit side to at least one oxygen mask, and at least one oxygen storage device, an outlet of which is configured to be simultaneously conductingly connected to the air decomposition device and to the oxygen mask.

5. The emergency oxygen supply apparatus according to claim 4, wherein the air decomposition device on its entry side is conductingly connectable to an aircraft cabin.

6. The emergency oxygen supply apparatus according to claim 5, wherein a compressor is arranged in a conduit connection from the aircraft cabin to the air decomposition device.

7. The emergency oxygen supply apparatus according to claim 6, wherein the compressor is a radial compressor.

8. The emergency oxygen supply apparatus according to claim 4, further comprising a control device for activating the air decomposition device and the oxygen storage device, the control device being signal-connected to a pressure sensor in an aircraft cabin.

9. The emergency oxygen supply apparatus according to claim 4, further comprising a control device for activating the air decomposition device and the oxygen storage device, the control device being signal-connected to an oxygen sensor in a conduit connection from the air decomposition device to the oxygen mask.

* * * * *